US008403297B2

(12) United States Patent
Cen

(10) Patent No.: US 8,403,297 B2
(45) Date of Patent: Mar. 26, 2013

(54) SWITCH FOR KITCHEN AND BATH APPLIANCES

(75) Inventor: Difeng Cen, Ningbo (CN)

(73) Assignee: Ningbo Bosheng Plumbing Co., Ltd., Ningbo, Zhejiang Province (CN)

( * ) Notice: Subject to any disclaimer, the term of this patent is extended or adjusted under 35 U.S.C. 154(b) by 987 days.

(21) Appl. No.: 12/219,361

(22) Filed: Jul. 21, 2008

(65) Prior Publication Data

US 2009/0026403 A1 Jan. 29, 2009

(30) Foreign Application Priority Data

Jul. 26, 2007 (CN) .......................... 2007 1 0070338

(51) Int. Cl.
*F16K 31/44* (2006.01)
*F16K 1/00* (2006.01)
*F16K 15/00* (2006.01)

(52) U.S. Cl. ......... 251/230; 251/227; 251/319; 251/318

(58) Field of Classification Search .................. 137/861, 137/862, 119.01, 119.03, 119.05, 872, 877, 137/878, 467, 118.07, 625.48, 454.2; 251/227, 251/230, 318, 319
See application file for complete search history.

(56) References Cited

U.S. PATENT DOCUMENTS 2,219,105 A * 10/1940 Klein ............................ 137/456
2,592,361 A * 4/1952 Herman Weber ............... 74/503
3,697,713 A * 10/1972 Ohkita .......................... 200/524
4,349,177 A * 9/1982 Shimada et al. .............. 251/230
4,956,529 A * 9/1990 Ueno ............................ 200/524
4,982,762 A * 1/1991 Lee et al. ................. 137/614.17
5,670,762 A * 9/1997 Futamura ..................... 200/16 D
2010/0171053 A1* 7/2010 Williamson et al. ............ 251/58

FOREIGN PATENT DOCUMENTS

SU 414438 * 6/1974

* cited by examiner

*Primary Examiner* — John K Fristoe, Jr.
*Assistant Examiner* — Hailey K Do
(74) *Attorney, Agent, or Firm* — Jacobson Holman PLLC; Jiwen Chen

(57) ABSTRACT

A switch for kitchen and bath appliances comprises a sliding shaft and a fixed base with a sliding through hole for the sliding shaft. The switch has a retaining hook for holding the sliding shaft. On the surface of the sliding shaft, there are a first and a second stop positions fitting with the hook part of the retaining hook. The first and second stop positions are at different height on the surface of the sliding shaft, with the first stop position close to the head of the sliding shaft. On the surface of the sliding shaft, there are the first and second unidirectional slide channels for the hook part of the retaining hook. The switch has a spring pushing the sliding shaft from head of the sliding shaft towards its tail. The switching on/off states are changed by a pressing operation.

5 Claims, 3 Drawing Sheets

SWITCH FOR KITCHEN AND BATH APPLIANCES

TECHNICAL FIELD

This present invention relates to a switch for kitchen and bath appliances

BACKGROUND TECHNOLOGY

Currently in the kitchen and bath field, switching mechanisms often have a complicated construction and are generally of the type pull-out switch, pull and pressing switch or pull and release switch, for example, a switch for a water diverter valve. These switches have a short service life and are subject to damages. Users also don't feel it is convenient to operate these switches. In addition, these switches are not interchangeable for different bathing appliances, which lead to the fact that different switches must be used for different types of bathing appliances, which increase manufacture and management complicacy and production cost.

SUMMARY OF THE INVENTION

A technical problem solved by the present invention is to provide a switch for kitchen and bath appliances that is easy to operate and has a long service life.

Accordingly, in a first aspect the present invention provides the following technical design:

A switch for kitchen and bath appliances comprises a sliding shaft, a fixed base, the fixed base having a sliding through hole for passing the sliding shaft, and a retaining hook. A surface of the sliding shaft comprises a first stop position and a second stop position fitting with a hook part of the retaining hook, and the first stop position and the second stop position are located at different heights on the sliding shaft, with the first stop position being closer to a head of the sliding shaft than the second stop position. The surface of the sliding shaft further comprises a first unidirectional slide channel for the hook part of the retaining hook, the first unidirectional slide channel letting the sliding shaft move from a state where the first stop position is fitting with the hook part of the retaining hook to a state where the second stop position is fitting with the hook part of the retaining hook, a second unidirectional slide channel for the hook part of the retaining hook, the second unidirectional slide channel letting the sliding shaft move from a state where the second stop position is fitting with the hook part of the retaining hook to a state where the first stop position is fitting with the hook part of the retaining hook. The first unidirectional slide channel comprises a first slide way section starting at the first stop position and a second slide way section connected with the first slide way section and leading to the second stop position, with the connection from the second slide way section to the first slide way section being farther away from the head of the sliding shaft than the second stop position. The said second unidirectional slide channel comprises a third slide way section starting at the second stop position and a fourth slide way section connected with the third slide way section, with the connection from the fourth slide way section to the third slide way section being farther away from the head of the sliding shaft than the second stop position. The fourth slide way section is connected with the first slide way section or connected to the first stop position. The switch further comprises a spring pushing the sliding shaft along a direction from the head of the sliding shaft towards its tail.

In a preferred embodiment the first slide way section and the second slide way section are connected in the form of a step, and at the connection between the first slide way section and the second slide way section, a channel bottom surface of the second slide way section is lower than a channel bottom section of the first slide way section. The third slide way section and the fourth slide way section are connected in the form of a step, and at the connection between the third slide way section and the fourth side way section, a channel bottom surface of the fourth slide way section is lower than a channel bottom surface of the third slide way section. The second slide way section comprises a down step near the second stop position. The fourth slide way section and the first slide way section are connected in the form of a step, and at the connection between the fourth slide way section and the first slide way section, the channel bottom surface of the first slide way section is lower than that the channel bottom surface of the fourth slide way section.

In another preferred embodiment the head of the sliding shaft or an extension of the sliding shaft extends out of the sliding through the hole in the fixed base.

Yet another preferred embodiment further comprises a circumferential positioning mechanism for the sliding shaft.

In a preferred embodiment the circumferential positioning mechanism comprises a positioning slot in axial direction provided on the sliding shaft and a positioning block provided on the fixed base, whereby the positioning block is fitted with the positioning slot.

In a preferred embodiment the retaining hook is connected by hooking to the fixed base, and on an outer side of the fixed base there is a ring spring for fixing the retaining hook.

In a preferred embodiment the retaining hook is connected by hooking to the positioning block on the fixed base, and on an outer side of the fixed base there is a ring spring for fixing the retaining hook.

In a preferred embodiment the fixed base includes a mounting piece and a connection sleeve connected with the rear part of the mounting piece, the sliding shaft being smaller near its tail or between its middle and tail, and the sliding shaft goes through the connection sleeve, the connection sleeve comprising a small hole that fits with the smaller part of the sliding shaft.

In a further preferred embodiment the retaining hook is connected by hooking on the mounting piece, and on an outer side of the mounting piece there is a ring spring for fixing the retaining hook.

In a preferred embodiment the tail of the sliding shaft is connected with a button, and the spring is located between the fixed base and the button.

The use of the technical design of the present invention changes traditional construction and operation method of the switch and provides simpler construction. In addition, the present invention allows changeover between switching-on and switching-off by only pressing the switch, so the present invention is easy to operate and better complies with a user's ergonomic habit of applying a force, with good sealing effect, excellent durability and long service life. In addition, the present invention uses moving and static arrangement of fixed seat and sliding shaft, and installs corresponding auxiliary mechanism on the head of the sliding shaft, the switch can be turned on and off, so it can be widely applied and has a general purpose, so that this present invention is applicable to different kitchen, bathing, water supply and heating facilities, for example, installation requirements of waste of the sink, water diverter valve and other kitchen & bathing appliances.

DETAILED DESCRIPTION OF THE PREFERRED EMBODIMENT

Embodiment 1

Figure 2:
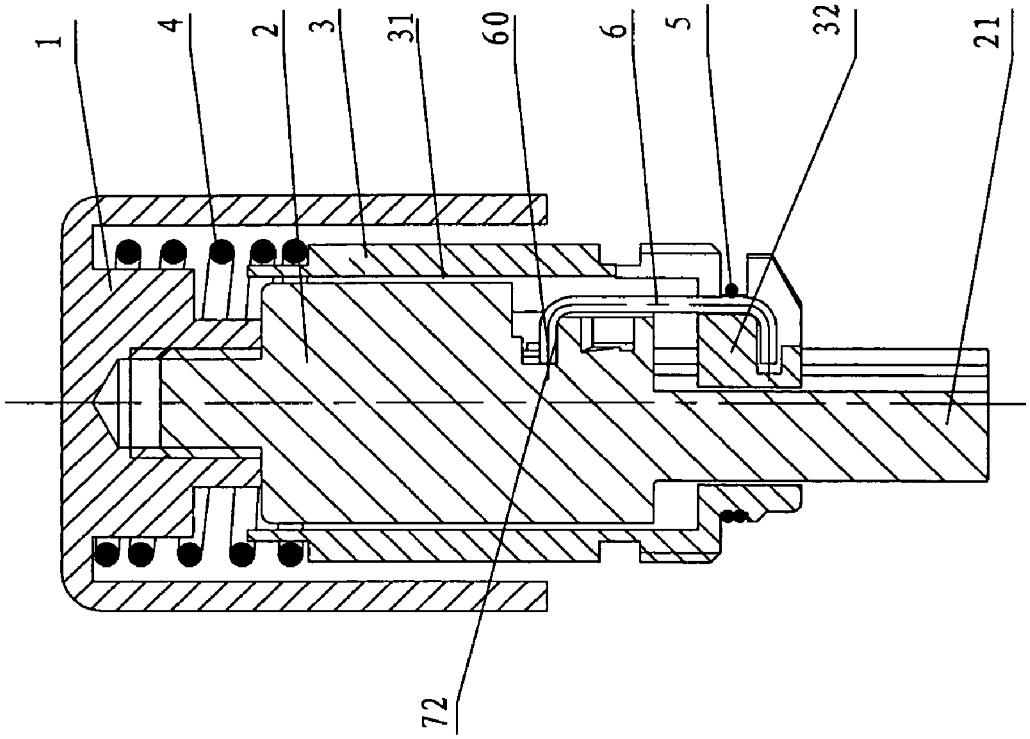
FIG. 2 is a sectional view of Embodiment 1 of the present invention when it fits with a second stop position at the hook part of the retaining hook.
Figure 1:
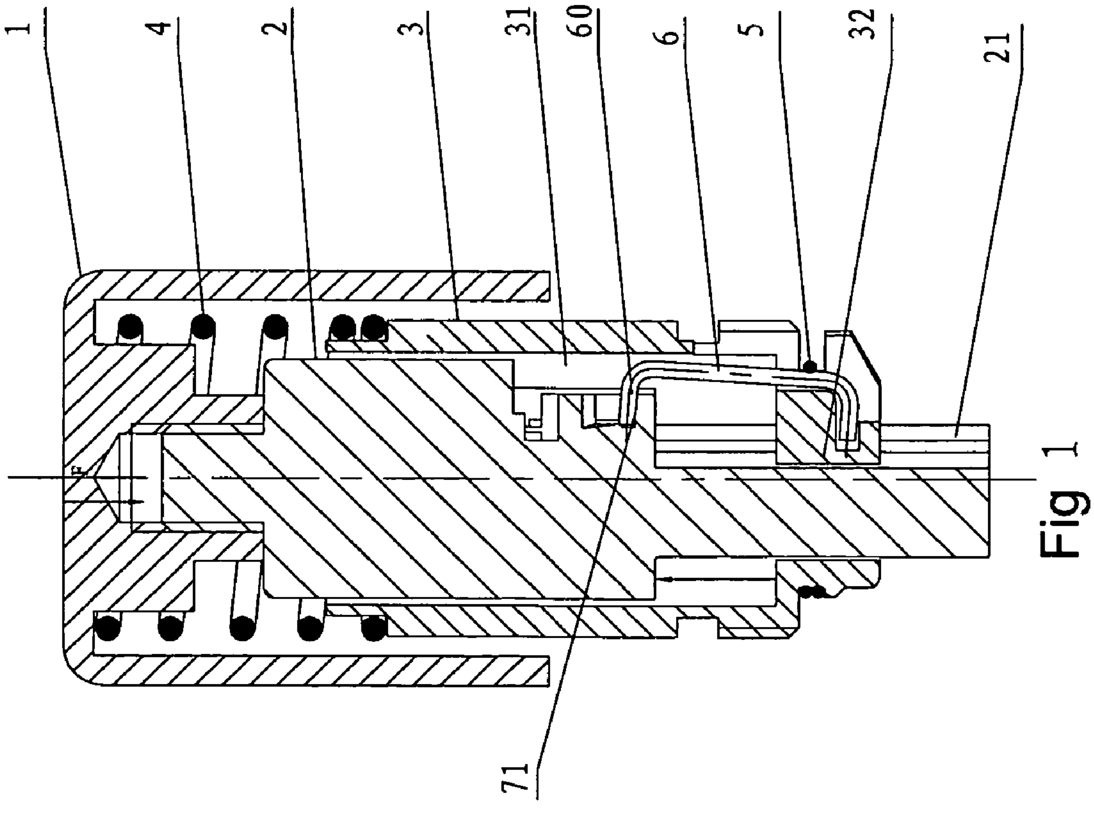
FIG. 1 is a sectional view of an example Embodiment 1 of the present invention when it fits with a first stop position at a hook part of a retaining hook.
Figure 3:
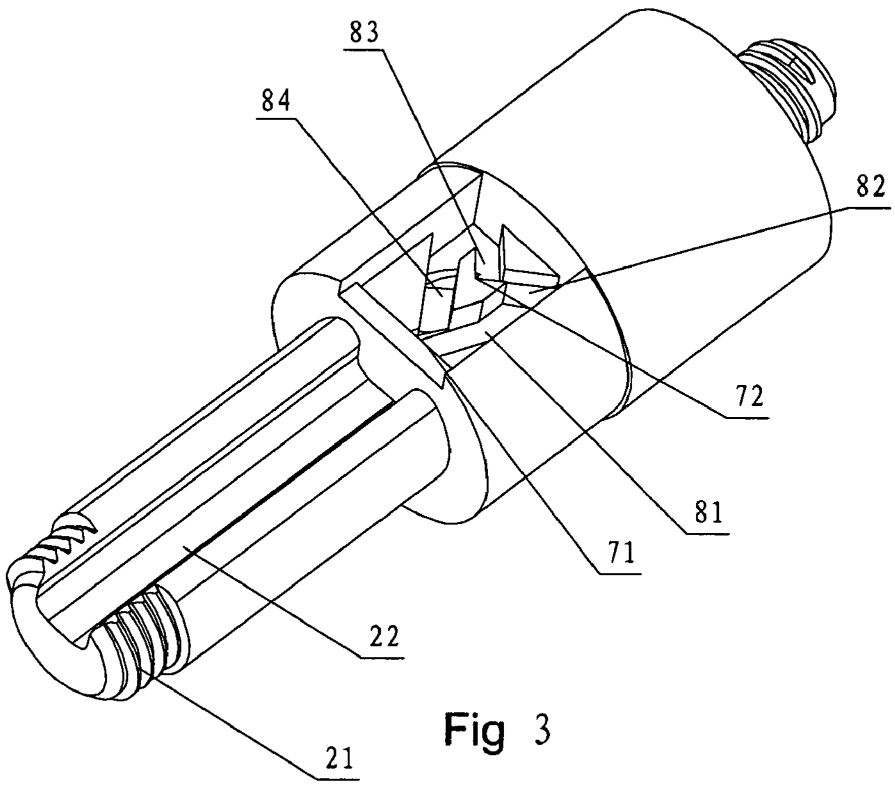
FIG. 3 is a diagram of a sliding shaft according to Embodiment 1 of the present invention.
Figure 4:
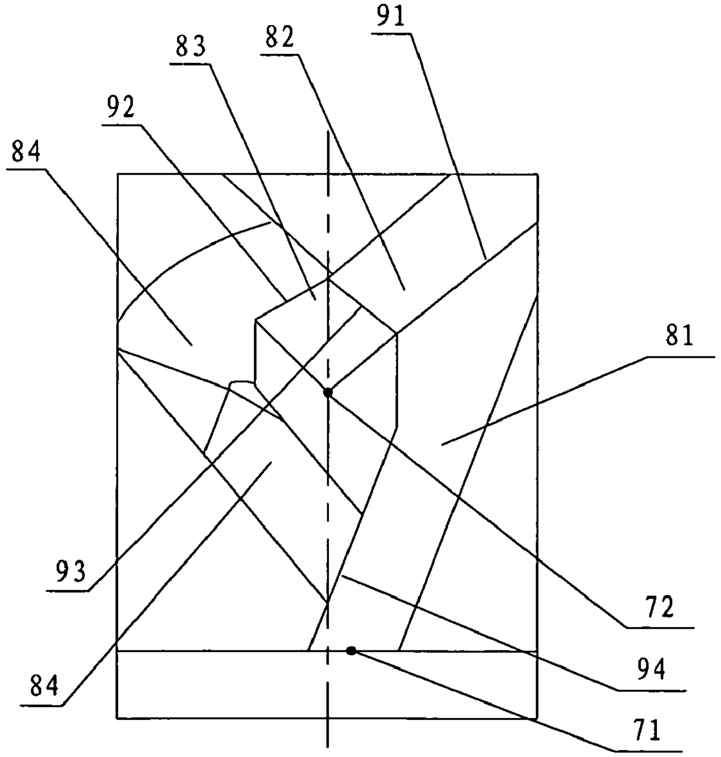
FIG. 4 is a front view of the sliding shaft shown in FIG. 3 located in a unidirectional slide channel and stop position.

Referring to FIG. 1-FIG. 4, a switch according to the present invention is provided with a sliding shaft 2 and a fixed base 3, and there is a sliding through a hole 31 on the fixed base 3, for passing the sliding shaft 2. The sliding shaft 2 passes the hole 31, and the head 21 of the sliding shaft 2 extends beyond the sliding through hole 31. If the head 21 of the sliding shaft 2 is connected with any extension, such extension may also extend out of sliding through hole 31 in the fixed base 3. In this embodiment, a tail of the sliding shaft 2 is connected with a button 1, at tail threads of the sliding shaft 2. The switch has a spring 4 pushing the union body of the button 1 and the sliding shaft 2 from the head 21 of the sliding shaft 2 towards its tail. The spring 4 can be located between the fixed base 3 and the button 1. The switch is also provided with a retaining hook 6 and a fixed head of the retaining hook 6 is connected to the fixed base 3. There is a ring spring 5 for fixing the fixed head of the retaining hook 6 on an outer side of the fixed base 3.

If there is a supporting bracket for the spring 4 in the device according the present invention, the spring 4 can also be located between the supporting bracket and the sliding shaft 2; the spring 4 can be positioned on the head 21 of the sliding shaft 2, inside the fixed base 3 or at any other positions where the sliding shaft 2 can obtain a force for moving from the head 21 to the tail. The retaining hook 6 can also be connected on a device using the present invention. The retaining hook 6 can also be connected to a part connected with the fixed base 3.

On the surface of the said sliding shaft 2, there are a first stop position 71 and a second stop position 72 fitting with a hook part 60 of the retaining hook 6, and the first stop position 71 and the second stop position 72 are located at different heights on the sliding shaft 2, with the first stop position 71 closer to the head 21 of the sliding shaft 2 than the second stop position. On the surface of the sliding shaft, there is a first unidirectional slide channel for the hook part 60 of the retaining hook 6. The first unidirectional slide channel lets the sliding shaft 2 move from a state where the first stop position 71 is fitting with the hook part 60 of the retaining hook 6 to a state where the second stop position 72 is fitting with the hook part 60 of the retaining hook 6. On the surface of the sliding shaft 2, there is a second unidirectional slide channel for the hook part 60 of the retaining hook 6. The second unidirectional slide channel lets the sliding shaft 2 to move from a state where the second stop position 72 is fitting with the hook part 60 of the retaining hook 6 to the state where the first stop position 71 is fitting with the hook part 60 of the retaining hook 6. The first unidirectional slide channel comprises a first slide way section 81 starting at the first stop position 71 and a second slide-way section 82 connected with the first slide way section 81 and leading to the second stop position 72, with the connection from the second slide-way section 82 to the first slide way section 81 being farther from the head 21 of the sliding shaft 2 than the second stop position 72. The second unidirectional slide channel comprises a third slide way section 83 starting at the second stop position 72 and a fourth slide way section 84 connected with the third slide way section 83, with the connection from the fourth slide way section 84 to the third slide way section 83 being farther away from the head 21 of the sliding shaft 2 than the second stop position 72, and the fourth slide way section 84 is connected with the first slide way section 81 or connected to the first stop position 71.

Relative unidirectional slide movement between the first unidirectional slide channel or the second unidirectional slide channel, and the hook part 60 can be provided through a slide channel design on a wall of the first and the second unidirectional slide channels, or a slide channel design on a bottom of the first and the second unidirectional slide channels. In this embodiment, such relative unidirectional slide movement is provided through the design of the slide channel on the bottom, so that the switch has higher operation reliability and longer service life. Its design scheme is as follows: the first slide way section 81 and second slide way section 82 are connected in the form of a step, and at a connection 91, the bottom of the second slide way section 82 is lower than that of the first slide way section 81. The third slide way section 83 and fourth slide way section 84 are connected in the form of a step, and at a connection 92, the bottom of the fourth slide way section 84 is lower than that of the third slide way section 83. The second slide way section 82 has a down step 93 near the second stop position 72. The fourth slide way section 84 and first slide way section 81 are connected in the form of a step, and at a connection 94, the bottom of the first slide way section 81 is lower than that of the fourth slide way section 84.

In order to operate the switch, a pressure force is applied on the button 1, and the button 1 drives the sliding shaft 2 to move down. In this case, retaining hook 6 is affected by the ring spring 5 and its fixing head is positioned on the fixed base 3. The hook part 60 of the retaining hook 6 moves up the first slide way section 81 from the first stop position 71. When the button 1 is depressed all the time, the hook part 60 of the retaining hook 6 moves into the second slide way section 82 at the connection 91. Now the button 1 is released, and the button 1 and the sliding shaft 2 move up under the action of spring 4, but as the first slide way section 81 and second slide way section 82 are connected in the form of a step, and at the connection 91, the channel bottom surface of the second slide way section 82 is lower than that of the first slide way section 81, the hook part 60 of the retaining hook 6 cannot move back on the original way and can only move down to the second stop position 72 area along the second channel to hook the vector point position of the second stop position 72, which is one state position of the switch and finishes downward movement of the sliding shaft 2. In this case, the spring 4 is compressed A user may depress the button again. Since the second slide way section 82 has a down step at the position near second stop position 72, and the hook part 60 of the retaining hook 6 cannot move back on the original way and can only move up along the third slide way section 83 and moves into the fourth slide way section 84. When the button 1 is released, the button 1 and the sliding shaft 2 move up under the action of spring 4. As the third slide way section 83 and fourth slide way section 84 are connected in the form of a step, and at the connection 92, the channel bottom surface of the fourth slide way section 84 is lower than that of the third slide way section 83. The hook part 60 of the retaining hook 6 cannot move back on the original way and can only move down to the first stop position 71 along the fourth slide way section 84 or move down into the first slide way section 81 along the fourth slide way section 84 and finally returns to the first stop position 71 and hooks the first stop position 71, which is another state position of the switch and finishes upward movement of the sliding shaft 2.

The present invention allows manual and accurate reciprocating motion of the necessary mechanism between the upper and lower vector points (i.e., the first stop position and the second stop position) to limit positions. By means of an additional auxiliary mechanism on the head 21 of sliding shaft 2, the sliding shaft 2 will drive the auxiliary mechanism to move up and down and thus provide switching on/off function. By installing additional seals, the switch can execute switching on/off function in the applications where liquid exist. In particular, it can execute switching on/off function widely in the field of kitchen and bathroom. In this embodiment, the head 21 of the sliding shaft 2 extends out of the sliding hole in order to connect with the auxiliary structure more easily and securely. If these conveniences and effects are not taken into account, the head 21 of the sliding shaft 2 may not extend out of the sliding hole, and the auxiliary structure is connected with the head 21 of sliding shaft 2 via a connection piece.

This embodiment is provided with a circumferential positioning mechanism for the sliding shaft 2, and fits with the immovable slide-way on sliding shaft through swinging of the hook part 60 of the retaining hook 6. This circumferential positioning mechanism comprises a positioning slot 22 in axial direction provided on the sliding shaft 2 and a positioning block 32 provided on the fixed base 3, the positioning block 32 is fitted with the positioning slot 22. The shape of the positioning block 32 can also be used for fitting with the retaining hook 6, as shown in the figure. The retaining hook is connected by hooking to the protruding positioning block 32 part of the fixed base 3. The circumferential positioning mechanism can also be the positioning channel that is provided in other position on the fixed base 3, such as inner hole. The protruding positioning block 32 is positioned at other corresponding position on the sliding shaft 2. In addition, the circumferential positioning mechanism can be other common circumferential positioning mechanism between shaft and sleeve or provide corresponding positioning function by means of a device.

In other example embodiments, the sliding shaft 2 can also be used to rotate by a specified angle to provide the fit between the slide-way and retaining hook 6, but it is not as convenient and comfortable in use as in the present embodiment.

Embodiment 2

Figure 5:
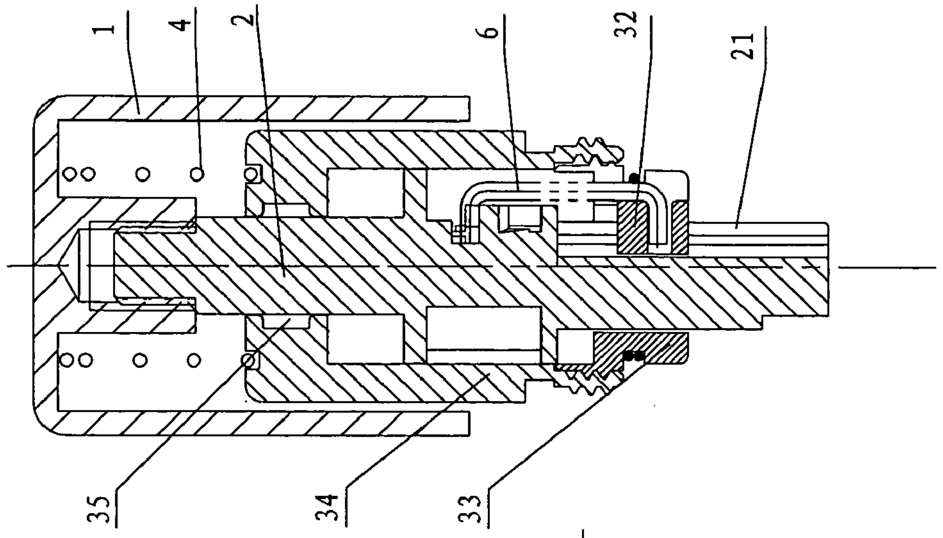
FIG. 5 is a sectional view of an example Embodiment 2 of the present invention when it fits with a first stop position at a hook part of a retaining hook.

The fixed base in Embodiment 1 can also be formed by some parts connected with each other. Referring to FIG. 5, in this embodiment, the fixed base includes a mounting piece 33 and a connection sleeve 34 connected with the rear part of the mounting piece 33. The sliding shaft 2 is smaller near its tail or between its middle and tail and goes through the connection sleeve 34. The connection sleeve 34 has a small hole 35 that fits with the smaller part of the sliding shaft 2. The retaining hook 6 is connected by hooking on the mounting piece 33. A ring spring for fixing the retaining hook 6 is provided on an outer side of the mounting piece 33.

Hence, the sealing device can be mounted on the smaller part of the sliding shaft 2 and is connected with the small hole 35 in the connection sleeve 34 in order to reduce sliding resistance and sealing difficulty, when the sliding shaft 2 must have a sealed connection with the fixed base 3.

Other parts of this embodiment are the same as Embodiment 1. The same item numbers in FIG. 5 as in FIGS. 1-4 have the same meanings as in FIGS. 1-4.

Embodiment 3

Figure 6:
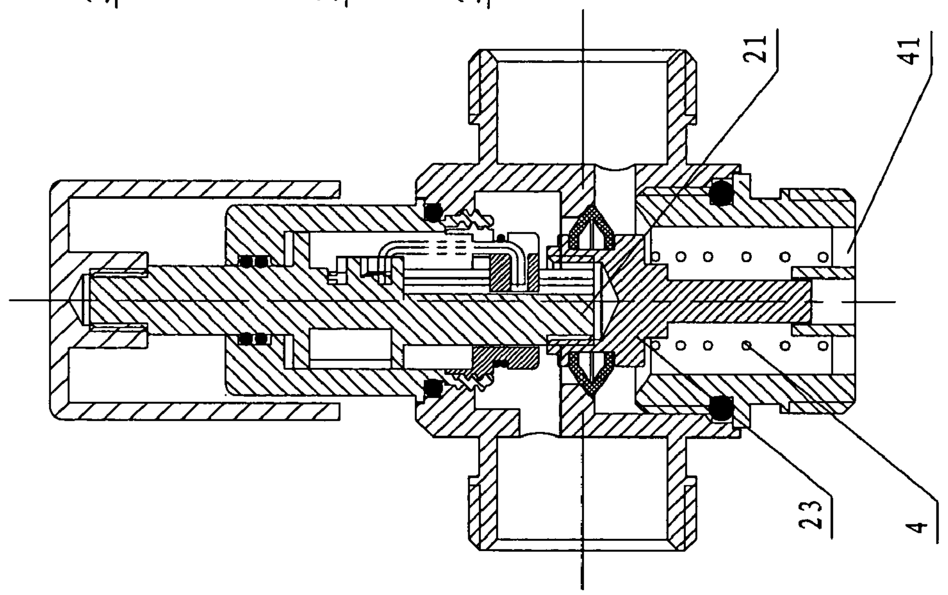
FIG. 6 is a diagram of the present invention when it is applied in a water diverter and the water diverter is in down water dispensing position.
Figure 7:
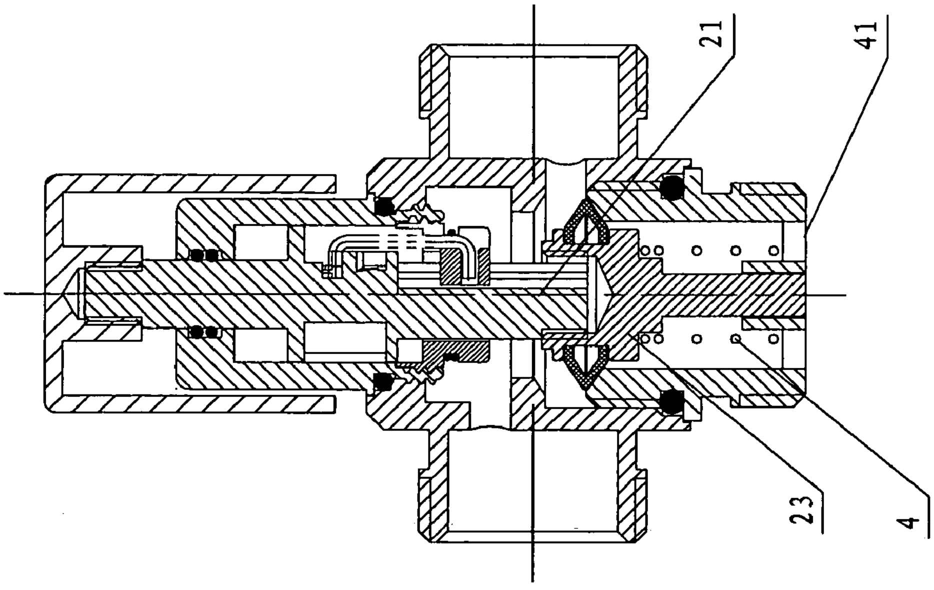
FIG. 7 is a sectional view of the present invention when it is applied for a water diverter and is in upper water dispensing position.

Refer to FIG. 6, in this embodiment, the present invention is installed on a water diverter. In this embodiment, a supporting bracket 41 for the spring 4 is mounted on the water diverter. The spring 4 is between the supporting bracket 41 and the valve core 23 connected with the head 21 of the sliding shaft 2. Up and down movement of the valve core 23 and sliding shaft 2 respectively turns on and off the water dispensing of upper and down sealing seats and thus provides control for upper dispensing and down dispensing.

Other parts of the switch according to this embodiment are the same as in Embodiment 2.

The invention claimed is:

1. A switch for fluid control in kitchen and bath appliances, wherein the switch comprises:

a sliding shaft, a fixed base, the fixed base having a sliding through hole for passing the sliding shaft, and a retaining hook, whereby a surface of the sliding shaft comprises a first stop position and a second stop position fitting with a hook part of the retaining hook, and the first stop position and the second stop position are located at different heights on the sliding shaft, with the first stop position being closer to a head of the sliding shaft than the second stop position, the surface of the sliding shaft further comprising a first unidirectional slide channel for the hook part of the retaining hook, the first unidirectional slide channel letting the sliding shaft move from a state where the first stop position is fitting with the hook part of the retaining hook to a state where the second stop position is fitting with the hook part of the retaining hook, a second unidirectional slide channel for the hook part of the retaining hook, the second unidirectional slide channel letting the sliding shaft move from a state where the second stop position is fitting with the hook part of the retaining hook to a state where the first stop position is fitting with the hook part of the retaining hook, the first unidirectional slide channel comprising a first slide way section starting at the first stop position and a second slide way section connected with the first slide way section and leading to the second stop position, with the connection from the second slide way section to the first slide way section being farther away from the head of the sliding shaft than the second stop position, the second unidirectional slide channel comprising a third slide way section starting at the second stop position and a fourth slide way section connected with the third slide way section, with the connection from the fourth slide way section to the third slide way section being farther away from the head of the sliding shaft than the second stop position, and the fourth slide way section is connected with the first slide way section or connected to the first stop position, the switch further comprising a first spring pushing the sliding shaft along a direction from the head of the sliding shaft towards its tail;

wherein the head of the sliding shaft or an extension of the sliding shaft extending from the head of the sliding shaft extends out of the sliding through hole in the fixed base for connection with an auxiliary structure for fluid control;

wherein the retaining hook is connected by hooking to the fixed base, and an O-shaped ring spring surrounds an outer surface of the fixed base and the retaining hook for fixing the retaining hook to the fixed base;

wherein the tail of the sliding shaft is connected with a button;

wherein the first slide way section and second slide way section are connected in the form of a step, and at the connection between the first slide way section and the second slide way section, a channel bottom surface of the second slide way section is lower than a channel bottom section of the first slide way section;

the third slide way section and the fourth slide way section are connected in the form of a step, and at the connection between the third slide way section and the fourth side way section, a channel bottom surface of the fourth slide way section is lower than a channel bottom surface of the third slide way section;

the second slide way section comprises a down step near the second stop position;

the fourth slide way section and the first slide way section are connected in the form of a step, and at the connection between the fourth slide way section and the first slide way section, the channel bottom surface of the first slide way section is lower than that the channel bottom surface of the fourth slide way section;

wherein the switch further comprises a circumferential positioning mechanism for the sliding shaft;

wherein the circumferential positioning mechanism comprises a positioning slot in an axial direction provided on the sliding shaft and a positioning block provided on the fixed base, whereby the positioning block is fitted with the positioning slot and wherein the retaining hook is connected by hooking to the positioning block on the fixed base.

2. The switch according to claim 1, wherein the fixed base includes a mounting piece and a connection sleeve connected with a rear part of the mounting piece, the sliding shaft being smaller near its tail or between its middle and tail, and the sliding shaft goes through the connection sleeve, the connection sleeve comprising a small hole that fits with the smaller part of the sliding shaft.

3. The switch according to claim 2, wherein the retaining hook is connected by hooking on the mounting piece.

4. The switch according to claim 1, wherein the first spring is located between the fixed base and the button, and directly engages both the fixed base and the button.

5. The switch for kitchen and bath appliances according to claim 1 wherein the fixed base includes a mounting piece and a connection sleeve connected with a rear part of the mounting piece, the sliding shaft being smaller near its tail or between its middle and tail, and the sliding shaft goes through the connection sleeve, the connection sleeve comprising a small hole that fits with the smaller part of the sliding shaft; and wherein a sealing device is mounted on the smaller part of the sliding shaft and is located within the small hole in the connection sleeve.

* * * * *